Patented June 19, 1923.

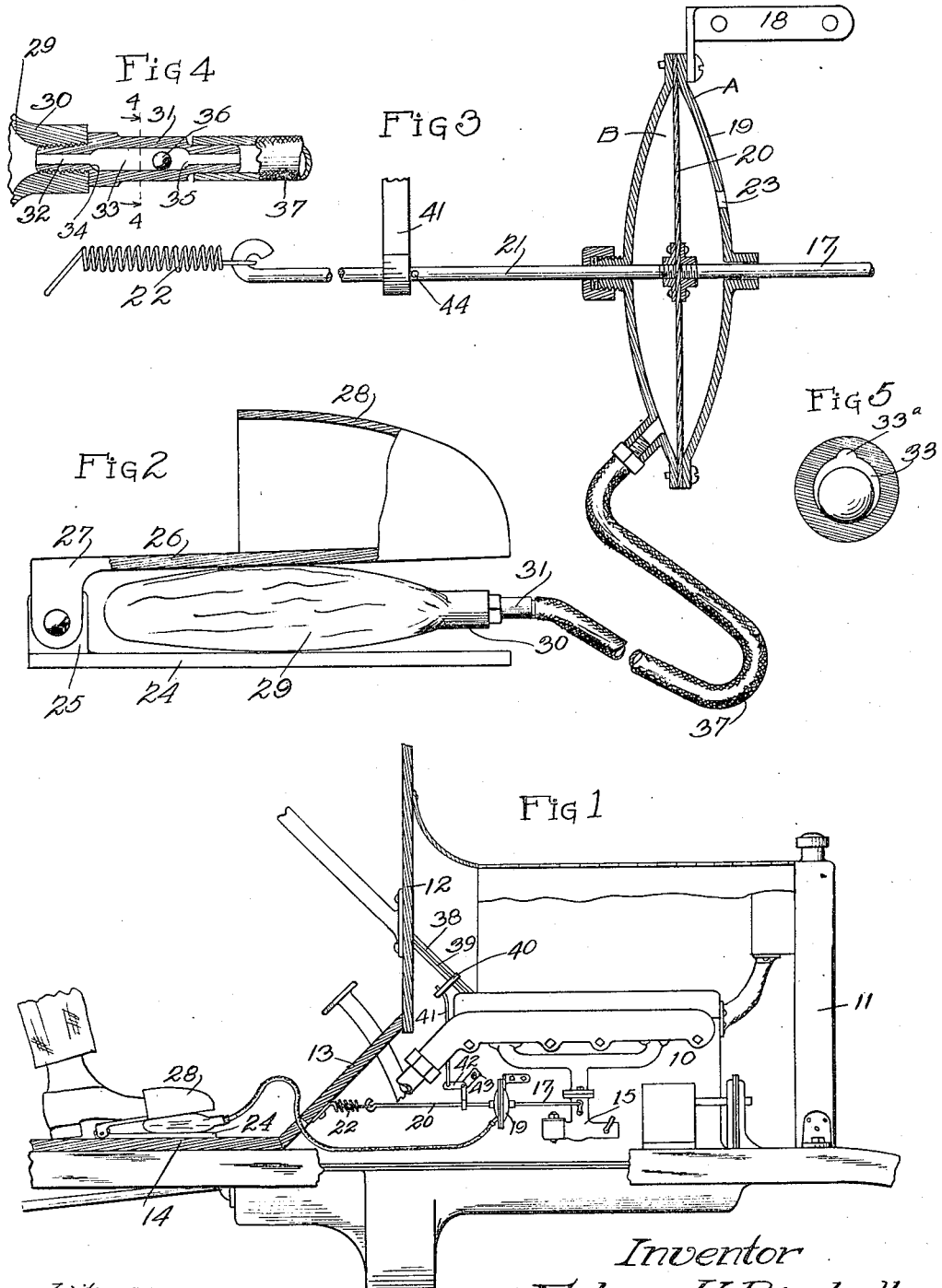

1,459,317

UNITED STATES PATENT OFFICE.

EDWIN HAROLD BIRDSALL, OF THORNTON, IOWA.

FOOT ACCELERATOR.

Application filed April 13, 1922. Serial No. 552,126.

*To all whom it may concern:*

Be it known that I, EDWIN HAROLD BIRDSALL, a citizen of the United States, and a resident of Thornton, in the county of Cerro Gordo and State of Iowa, have invented a certain new and useful Foot Accelerator, of which the following is a specification.

The object of my invention is to provide a foot accelerator adapted to be mounted on a car or to be installed thereon, when the car is built in the factory, and capable of being moved freely from place to place with the foot of the driver, so that the driver may be relieved from the fatigue of keeping his foot in one place on an accelerator that is not movable from place to place.

A further object is to provide an accelerator device of novel construction.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a vertical, sectional view through the floor, foot-board, dash and cowl of a motor vehicle, equipped with a foot accelerator embodying my invention.

Figure 2 shows an enlarged, detail, view of parts of my foot accelerator, parts of the device being shown in section.

Figure 3 shows a detailed view of the other parts of the foot accelerator, the diaphragm structure being shown in section.

Figure 4 shows a longitudinal, sectional view of a portion of the tube, through which the liquid for controlling the diaphragm passes; and Figure 5 shows a detailed, sectional view taken on the line 5—5 of Figure 4.

In the accompanying drawings, I have used the reference numeral 10 to indicate generally the engine of a motor vehicle, having a radiator 11, dash 12, foot board 13, and a floor 14.

At the side of the engine is the carburetor 15, having the arm 16, whereby the throttle valve is operated. Pivoted to the arm 16 is a rod 17, which, in the arrangement of the invention here shown, extends rearwardly.

Mounted on a suitable bracket 18 is a diaphragm case 19, the interior of which is divided into compartments A and B, by the flexible diaphragm 20.

The rear end of the rod 17 is slidably mounted in the forward wall of the casing 19 and is secured to the diaphragm 20. Secured to the opposite side of the diaphragm 20 and slidably mounted in the wall of the casing 19 is a rearwardly extending rod 21.

A spring 22 is suitably mounted on some fixed part of the motor vehicle and is connected with the rear end of the rod 21.

The front wall of the casing 19 has a suitable opening 23.

Resting on the floor 14 and adapted to be readily moved about thereon is a base or supporting member 24, having at its rear portion, upwardly projecting ears or the like 25. Spaced above the base 24 is a foot pedal or the like 26, having ears 27, pivotally connected with the ears 25. On the forward portion of the pedal 26 is a stirrup device 28 to receive the toe of the shoe of the driver of the car.

Arranged between the pedal 26 and the support or base 24 is a flexible casing or bag 29, having a tubular discharge end of substantially rigid material 30. Connected with the end 30 is a short valve casing tube 31, which is particularly illustrated in Figure 4.

A passage 32 extends through the valve casing 31 and has a central, enlarged portion 33 at the ends of which are the shoulders 34 and 35. A ball 36 is received in the enlarged portion 33 and is adapted to travel from end to end thereof. The valve casing 31 is designed, when in use, to rest in position inclined slightly upwardly, as illustrated in Figure 1, so that the ball 36 will normally rest at the lower or rear end of the enlarged opening 33.

A flexible tube 37 communicates with the valve casing tube 31 and with the compartment B of the diaphragm case 19, as shown in Figures 2 and 3, and also in Figure 1.

It may be mentioned that the enlarged portion 33, has at its upper part a groove 33ª, so that the ball 36 never entirely closes the passage through the valve casing.

Mounted on the steering post 38 is the ordinary throttle rod 39, on which is an arm 40. Pivoted to the arm 40 is a link 41. The link 41 is also pivoted to a bell crank 42, pivoted between its ends on a bracket 43, and having one end slidably mounted on the rod 21, as shown in Figures 1 and 3.

A stop 44 is arranged on the rod 21 forwardly of the arm of the bell crank lever 42.

In the use of my improved accelerator, the operator places his foot on the pedal 26. By inserting the shoe into the stirrup member 28, it is possible to shift the foot pedal and the support 24 and the bag 29 about on the floor of the car, so that the foot may be adjusted to different positions, exercising different muscles, and reducing the muscular strain.

It will be seen that by pressing downwardly on the foot pedal, the oil or other liquid in the bag 29 will be forced through the tube 27 to the closed compartment B of the diaphragm chamber, and the diaphragm 20 will be forced forwardly, thus actuating the rod 17, for opening the throttle.

As soon as the foot pressure is released, the spring 22 will tend to close the throttle and also to move the diaphragm 20 rearwardly for forcing the liquid back into the bag 29.

The valve 36 is simply for the purpose of preventing any sudden and extreme forcing of the liquid through the diaphragm chamber from the bag, which might otherwise occur, due to lurches of the car or other vibration or the like.

It will be seen that the hand lever may be operated in the ordinary way for actuating the throttle.

It will be seen from the foregoing that my foot accelerator is of very simple construction and can be installed when the car is built or can readily be placed on the car, as an attachment.

I not only make it possible to shift the foot about from place to place and yet maintain control of the accelerator, but I find that I can with this device secure a steadier foot feed, than I have been able to accomplish with other foot accelerators.

The use of the ball valve 36 prevents a sudden opening of the throttle, but permits the steady opening thereof, by preventing a sudden flow of a large amount of fluid to the compartment B, but permitting a steady flow of fluid thereto.

On account of the construction just mentioned, and the fact that the throttle can not be suddenly thrown wide open by my foot accelerator, I find that the wear and strain on the engine is considerably reduced.

Some changes may be made in the construction and arrangement of the various parts of my device without departing from the real spirit and purpose of my invention, and it is my intention to cover by my claims, any modified forms of structure or use of mechanical equivalents, which may be reasonably included within their scope.

I claim as my invention:

1. A device of the class described comprising a throttle actuating rod, a freely movable base, a foot pedal pivotally connected with said base, a flexible receptacle carried by said base adapted to be compressed by the foot pedal, and means whereby the compression of the receptacle and the consequent movement of the contents thereof actuates said rod.

2. In a device of the class described, a throttle valve actuating rod, means tending to yieldingly hold said rod in one position of its movement, a base member, capable of free movement on the floor of a car, a foot pedal pivotally supported thereon and means for imparting movement to said rod, including an element supported on said base adjacent to the pedal and adapted to be actuated by the pivotal movement of the foot pedal.

3. In a foot accelerator structure, a throttle actuating rod, means for actuating said rod, a foot supporting and receiving member freely movable from place to place and also of tilting movement, and means for operating said first means including a liquid holding structure, capable of actuation by the tilting movement of said member for moving liquid therein.

4. In a foot accelerator, a throttle actuating rod, a foot supporting and receiving member freely movable from place to place having a base element and a pivoted element, and means including a liquid holding structure connected with one of said last elements and with said rod adapted to be operated by the movement of the pivoted element on its pivot for moving a liquid content therein and thus actuating said throttle control valve.

5. In a foot accelerator, a diaphragm casing, a flexible diaphragm therein, means for connecting said diaphragm with the throttle valve of the carburetor, yielding means for normally holding said diaphragm in one position of its movement, a foot pedal pivotally supported, a flexible container adjacent thereto, and means for connecting said container with said diaphragm casing on one side of the diaphragm therein.

6. In a foot accelerator, a diaphragm casing, a flexible diaphragm therein, means for connecting said diaphragm with the throttle valve of a carburetor, yielding means for normally holding said diaphragm in one position of its movement, a foot pedal pivotally supported, a flexible container adjacent thereto, and means for connecting said container with said diaphragm casing on one side of the diaphragm therein, said last means having interposed therein a check valve.

Des Moines, Iowa, March 29, 1922.
EDWIN HAROLD BIRDSALL.